(12) United States Patent
Wilson et al.

(10) Patent No.: US 11,883,985 B2
(45) Date of Patent: Jan. 30, 2024

(54) SYSTEMS AND METHODS FOR CASTING PROPELLANT GRAIN

(71) Applicant: GOODRICH CORPORATION, Charlotte, NC (US)

(72) Inventors: Brian Wilson, Vacaville, CA (US); Jean C. Rodriguez, Vallejo, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 591 days.

(21) Appl. No.: 17/022,931

(22) Filed: Sep. 16, 2020

(65) Prior Publication Data

US 2022/0080629 A1    Mar. 17, 2022

(51) Int. Cl.
*B29C 39/26* (2006.01)
*B29C 39/36* (2006.01)
*F02K 9/24* (2006.01)
*B29C 33/44* (2006.01)

(52) U.S. Cl.
CPC ............ *B29C 39/26* (2013.01); *B29C 33/448* (2013.01); *B29C 39/36* (2013.01); *F02K 9/24* (2013.01); *B29K 2901/12* (2013.01)

(58) Field of Classification Search
CPC ....... B29C 39/26; B29C 33/448; B29C 39/36; B29C 33/304; B29C 39/028; B29K 2901/12; B29K 2009/00; F02K 9/24
See application file for complete search history.

(56) References Cited

U.S. PATENT DOCUMENTS

| 9,429,104 | B2 | 8/2016 | Fuller |
| 9,822,045 | B2 | 11/2017 | Jones |
| 10,023,505 | B2 | 7/2018 | Danforth et al. |
| 2011/0308711 | A1* | 12/2011 | Coleman ............... B29C 70/446 156/189 |
| 2018/0273438 | A1 | 9/2018 | Conroy et al. |

* cited by examiner

*Primary Examiner* — Francisco W Tschen
*Assistant Examiner* — Elisa H Vera
(74) *Attorney, Agent, or Firm* — SNELL & WILMER L.L.P.

(57) ABSTRACT

Systems and methods for casting solid propellants include a mandrel for forming geometric features in a perforation of a propellant grain. In various embodiments, the mandrel includes a frangible portion that is removed from the propellant grain after the propellant grain has cured around the mandrel. A second portion of the mandrel may be left behind in the propellant grain. The mandrel may include a support structured disposed in the through hole of the mandrel. The support structure may include a plurality of longitudinal channels for directed exhaust gasses through the mandrel upon ignition of the propellant grain.

9 Claims, 6 Drawing Sheets

SYSTEMS AND METHODS FOR CASTING PROPELLANT GRAIN

FIELD

The present disclosure relates generally to solid fuel propulsion systems, and more particularly, to systems and methods for casting motor propellants.

BACKGROUND

Solid propellant propulsion systems may include a solid propellant grain material that is cast around a core. The core is then removed by sliding it out the cast grain material, leaving an open central bore, sometimes referred to as a hollow core or center perforated (CP) core motor design. Ignition at the bore surface of the solid propellant generates high pressure gas, which is expelled from the bore through a nozzle to generate thrust.

SUMMARY

A mandrel for forming a solid propellant is disclosed, comprising an elongated body comprising a first portion and a second portion axially adjacent the first portion, wherein the first portion is configured to break apart from the second portion after a propellant grain has been cured around the elongated body.

In various embodiments, the mandrel further comprises a through hole disposed in the elongated body.

In various embodiments, the second portion comprises a non-longitudinal feature.

In various embodiments, the mandrel further comprises a groove disposed in the elongated body, wherein the groove is disposed between the first portion and the second portion.

In various embodiments, the mandrel further comprises a support structure disposed in the through hole.

In various embodiments, the support structure comprises a plurality of longitudinal channels.

In various embodiments, the mandrel further comprises an end portion and a tapered portion, wherein the end portion is coupled to the first portion via the tapered portion.

In various embodiments, the first portion and the second portion comprises a single, monolithic piece of material.

In various embodiments, the elongated body comprises a thermoplastic material.

A method for casting a solid propellant is disclosed, comprising disposing a mandrel with respect to a casting tube, wherein a cavity is formed between the mandrel and the casting tube, moving an uncured propellant grain into the cavity, curing the propellant grain around the mandrel, wherein a perforation is formed in the cured propellant grain via the mandrel, breaking a first portion of the mandrel apart from a second portion of the mandrel, and removing the first portion from within the cured propellant grain, while leaving the second portion embedded in the cured propellant grain.

In various embodiments, the method further comprises coupling a first end cap to the casting tube.

In various embodiments, the method further comprises coupling a second end cap to the casting tube.

In various embodiments, the method further comprises breaking a third portion of the mandrel apart from the second portion of the mandrel, and removing the third portion from within the cured propellant grain, while leaving the second portion embedded in the cured propellant grain.

A mandrel for forming a solid propellant is disclosed, comprising an elongated body, a through hole disposed in the elongated body, and a support structure disposed in the through hole.

In various embodiments, the support structure comprises a plurality of walls extending from an inner surface of the elongated body.

In various embodiments, the support structure comprises a plurality of longitudinal channels.

In various embodiments, the support structure and the elongated body are monolithically formed.

In various embodiments, the mandrel further comprises a non-longitudinal feature disposed on an outer surface of the elongated body.

In various embodiments, the mandrel further comprises a protuberant surface disposed on the elongated body.

In various embodiments, the mandrel further comprises a plurality of fins disposed on an outer surface of the elongated body.

In various embodiments, the mandrel further comprises a helically extending ridge disposed on an outer surface of the elongated body.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1A:
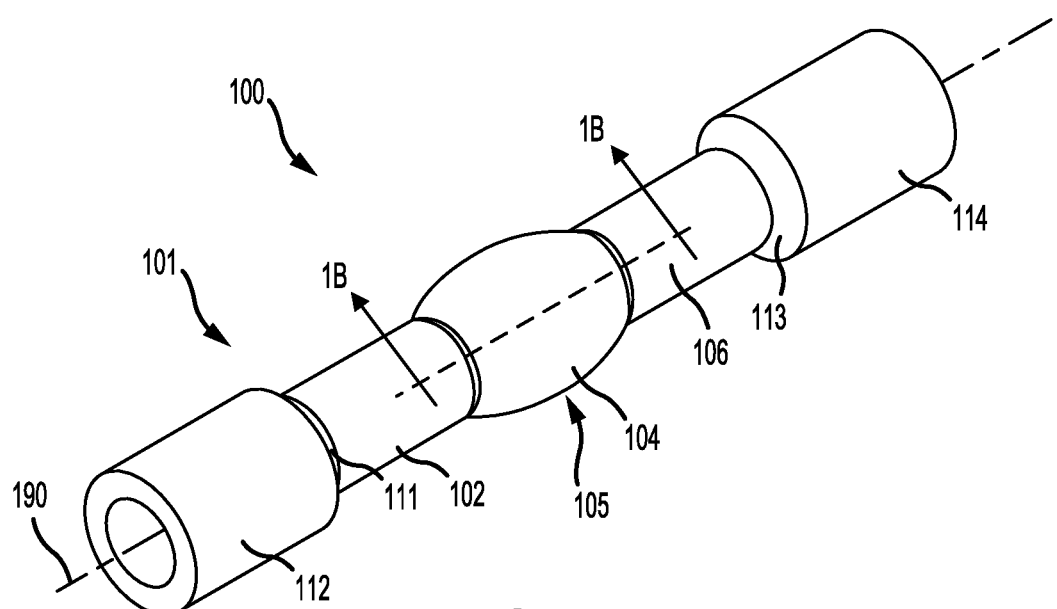
FIG. 1A illustrates a schematic view of a frangible mandrel for casting a propellant grain, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

The present disclosure provides systems and methods for solid fuel vehicles (e.g., a solid propellant rocket motor) which are capable of variable thrusts during the course of the vehicle's flight. Propellant grains of the present disclosure may be of a core-burning configuration. Core-burning configuration, as that term is used herein, means a solid propellant motor utilizing a propellant grain in which the burning front progresses substantially from the hollow core of the propellant grain radially outward toward the outer surface of the propellant grain. Solid propellant motors with variable thrusts are desirable because they can achieve thrust profiles which are optimized for the entire flight. For example, while solid fuel vehicles require large thrusts at the initial period of flight to achieve lift-off, they may require less thrust at later periods of flight. This reduction of required thrust may be due to the changing mass of the solid propellant motor during the course of its flight and/or other flight conditions, such as altitude, temperature, etc. The weight of a solid propellant motor may be at a maximum at the start of its flight, because it contains all the propellant to be used over the whole flight. Once the flight begins, the propellant starts to be consumed and expelled to produce the needed thrust. Since acceleration is equal to force divided by mass, as the mass of the solid propellant vehicle decreases, the acceleration from a constant propulsion force increases. If the thrust is not reduced at later periods of the vehicle's flight, the acceleration may increase to a magnitude which can damage elements of the vehicle and/or decrease overall efficiency of the vehicle. Furthermore, it may be desirable to have thrust/performance profiles that cannot be met by a single geometry profile throughout the length of a propellant grain.

With reference to FIG. 1A, a mandrel 100 for manufacturing a propellant grain is illustrated, in accordance with various embodiments. Mandrel 100 may comprise a thermoplastic polymer material, such as acrylonitrile butadiene styrene (ABS), polyvinyl alcohol (PVA), polylactic acid (PLA), and/or polycarbonate, among others. Mandrel 100 may be manufactured using an additive manufacturing process. In various embodiments, mandrel 100 is manufactured using a 3D printing process. Mandrel 100 is shaped to form a desired port, also referred to as a perforation, within a propellant grain. In this regard, the geometry of mandrel 100 may be manufactured to correspond (e.g., be substantially equivalent to) to the negative space of the propellant grain perforation. In various embodiments, mandrel 100 may include, but is not limited to, at least one of a helical shape and a three-dimensional geometric shape with at least one non-longitudinal feature. As used herein, the term non-longitudinal feature refers to a geometric feature defining an outer surface of mandrel 100 comprising a profile that varies along the longitudinal direction. In various embodiments, mandrel 100 may comprise a relatively thin-walled structure incorporating one or more of the above shapes.

In various embodiments, mandrel 100 extends along a central axis 190 (also referred to as a longitudinal axis). Mandrel 100 may comprise an elongated body 101 extending along central axis 190. In various embodiments, mandrel 100 is at least twice as long as it is wide, wherein the width is measured perpendicular to central axis 190. Mandrel 100 may include a first portion 102 and a second portion 104 axially adjacent the first portion 102. Second portion 104 may comprise a non-longitudinal feature. In various embodiments, second portion 104 comprises a protuberant surface 105. In this regard, and with additional reference to FIG. 1B, a total width $W_1$ (which may be the maximum diameter for axisymmetric surfaces) of second portion 104 may be greater than the total width $W_2$ (which may be the maximum diameter for axisymmetric surfaces) of first portion 102. In various embodiments, total width $W_1$ is a maximum width of second portion 104. In various embodiments, total width $W_2$ is a maximum width of first portion 102.

Figure 1B:
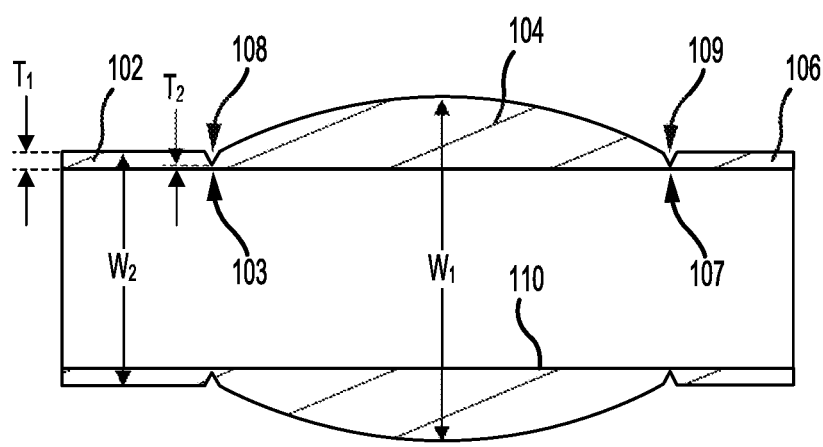
FIG. 1B illustrates a cross section view of a portion of the frangible mandrel of FIG. 1A, in accordance with various embodiments.

With reference to FIG. 1B, mandrel 100 is a frangible mandrel, wherein the first portion 102 is configured to separate from the second portion 104 after a casting process, as described herein in further detail. In this regard, a groove 108 may be formed in mandrel 100 at an interface between first portion 102 and second portion 104 such that the first portion 102 and the second portion 104 are connected by a minimal amount of material (also referred to herein as an intermediate portion) to assist breaking first portion 102 apart from second portion 104. In this regard, a minimum wall thickness $T_1$ of first portion 102 may be greater than a maximum wall thickness $T_2$ of mandrel 100 at groove 108. Stated differently, mandrel 100 may comprise a minimum wall thickness at the location of groove 108. In this regard, first portion 102 may be connected to second portion 104 via an intermediate portion 103. Intermediate portion 103 may comprise the material of mandrel 100 located radially inward from groove 108. In this regard, intermediate portion 103 comprises wall thickness $T_2$. The intermediate portion 103 is configured to break in response to at least one of a torsional force and a tension force applied between first portion 102 and second portion 104. In various embodiments, groove 108 perimetrically surrounds mandrel 100. A third portion 106 may similarly extend from second portion 104. Mandrel 100 may further comprise a third portion 106 extending from second portion 104. A groove 109 may be formed in mandrel 100 at an interface between third portion 106 and second portion 104 such that the third portion 106 and the second portion 104 are similarly configured to break apart. In this regard, third portion 106 may be connected to second portion 104 via an intermediate portion 107. Intermediate portion 107 may comprise the material of mandrel 100 located radially inward from groove 109. In this regard, intermediate portion 107 comprises wall thickness $T_2$, in accordance with various embodiments. The intermediate portion 107 is configured to break in response to at least one of a torsional force and a tension force applied between third portion 106 and second portion 104.

In various embodiments, mandrel 100 further comprises an end portion 112 axially adjacent first portion 102. The width of end portion 112 may be greater than the total width $W_2$ of first portion 102. Mandrel 100 may further comprise a tapered portion 111 disposed between end portion 112 and first portion 102. In various embodiments, tapered portion 111 comprises a frustoconical geometry. In this regard, first portion 102 and end portion 112 are connected via tapered portion 111. Mandrel 100 may further comprise an end portion 114 axially adjacent third portion 106. The width of end portion 114 may be greater than the total width of third portion 106. Mandrel 100 may further comprise a tapered portion 113 disposed between end portion 114 and third portion 106. In various embodiments, tapered portion 113 comprises a frustoconical geometry. In this regard, third portion 106 and end portion 114 are connected via tapered portion 113. End portion 112, tapered portion 111, first portion 102, second portion 104, third portion 106, tapered portion 113, and end portion 114 may be formed as a single monolithic piece of material.

Figure 2A:
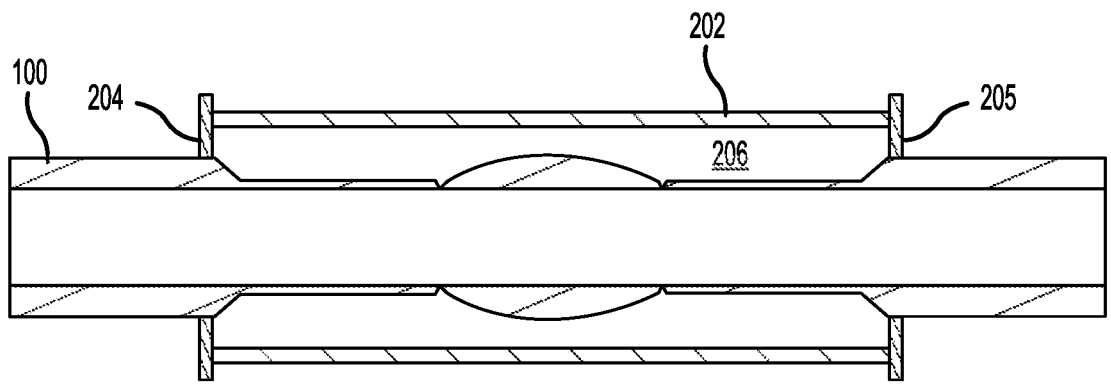
FIG. 2A, FIG. 2B, FIG. 2C, and FIG. 2D illustrate various steps of a propellant grain casting process, in accordance with various embodiments.
Figure 2B:
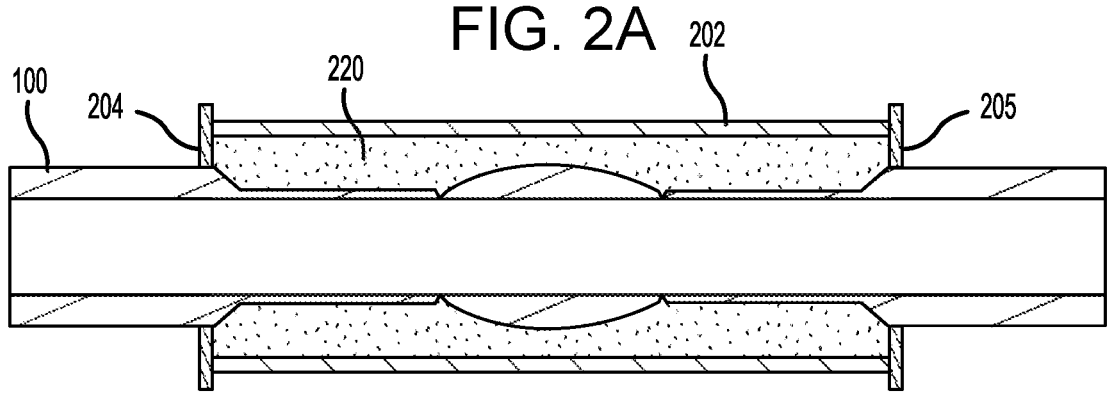

With reference to FIG. 2A through FIG. 2D, various steps of a propellant grain casting process is illustrated, in accordance with various embodiments. The tooling setup to produce the propellant grain depicted in FIG. 3 is shown in FIG. 2A. Mandrel 100 may be placed at least partially within a casting tube 202. End caps may be placed at either side of the casting tube 202 to enclose the cavity 206 where the propellant grain is injected. In this regard, a first end cap 204 may be coupled to a first end of the casting tube 202 and a second end cap 205 may be coupled to a second end of the casting tube 202. First end cap 204 and second end cap 205 may further secure mandrel 100 in a concentric relationship with casting tube 202. Mandrel 100 may extend through casting tube 202. Referring now to FIG. 2B, to produce the propellant grain, an end cap may be removed and the casting tube 202 may be filled with a propellant grain 220 that is uncured (e.g., a viscous liquid). The end cap may be replaced to allow the propellant grain 220 to be cast in place. During the casting process, the propellant grain 220 will cure and take the negative shape of the mandrel 100. In various embodiments, propellant grain 220 may be comprised of a composite propellant comprising both a fuel and an oxidizer mixed and immobilized within a cured polymer-based binder. For example, propellant grain 220 may comprise an ammonium nitrate-based composite propellant (ANCP) or ammonium perchlorate-based composite propellant (APCP). In various embodiments, propellant grain 220 may comprise a distribution of AP ($NH_4ClO_4$) grains embedded in a hydroxyl-terminated polybutadiene (HTPB) matrix.

Figure 2C:
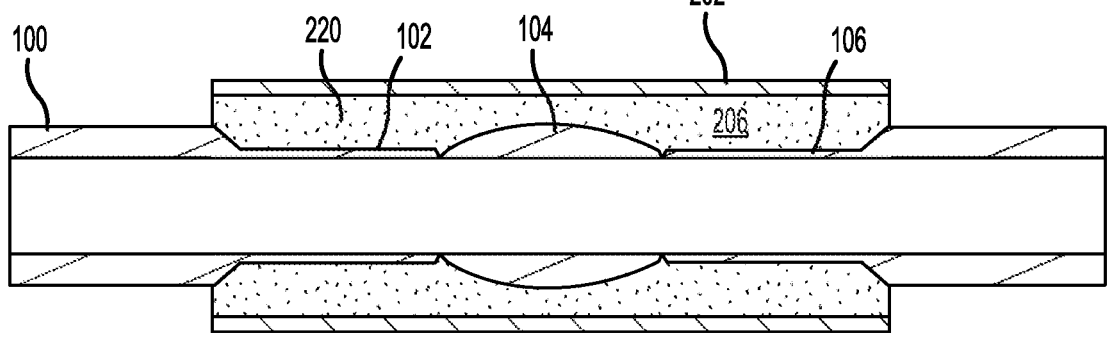
Figure 2D:
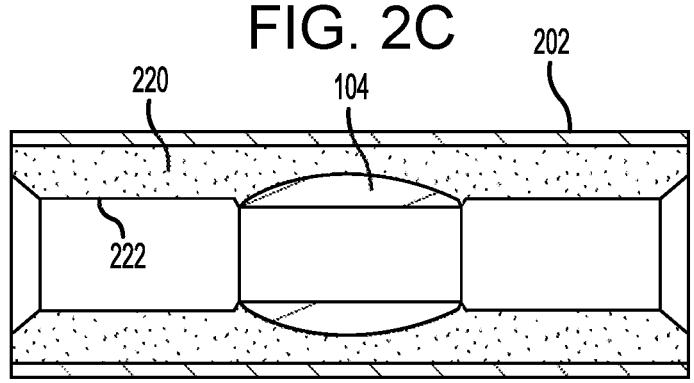
Figure 3:
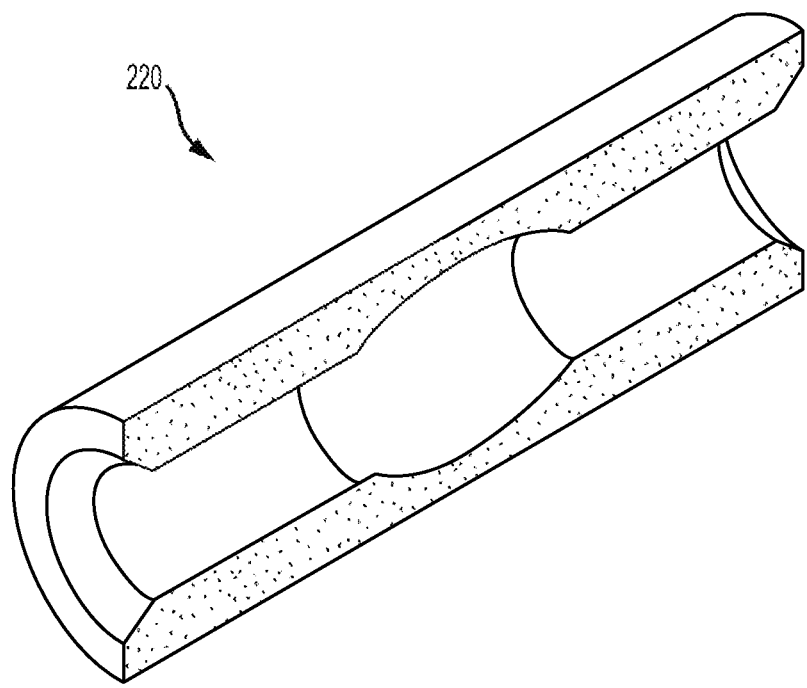
FIG. 3 illustrates a section view of the propellant grain formed with the casting process of FIG. 2A through FIG. 2D, in accordance with various embodiments.

With reference to FIG. 2C and FIG. 2D, after the propellant grain 220 is fully cured and cast in place, the end caps (e.g., end cap 204 and end cap 205) may be removed. Furthermore, the first portion 102 may be removed from the propellant grain 220. Stated differently, first portion 102 may be broken apart from second portion 104 to remove the first portion 102 from within the propellant grain 220, while leaving second portion 104 embedded in the propellant grain 220. In various embodiments, torque and/or tension may be applied by hand to mandrel 100 to break apart first portion 102 from second portion 104 after the propellant grain 220 has cured around mandrel 100. Third portion 106 may be similarly broken apart from second portion 104. In this regard, part (i.e., first portion 102 and third portion 106) of mandrel 100 is removed from propellant grain 220 and part (i.e., second portion 104) of mandrel 100 remains within the propellant grain 220. In various embodiments, first portion 102 and third portion 106 are coated with a non-stick material, such as polytetrafluoroethylene, to prevent first portion 102 and third portion 106 from attaching to the propellant grain 220 and assist in removal. With reference to FIG. 2D, the casting process may be finished with the propellant grain 220 comprising a perforation 222 in the shape of the mandrel 100. In this manner, non-longitudinal and/or complex geometries may be formed into propellant grain 220 to tailor the burn cycle of the propellant grain in accordance with a desired burn profile. In various embodiments, FIG. 2D illustrates a solid propellant motor comprising the outer casing 202, the propellant grain 220, and the second portion 104 of the mandrel. Second portion 104 may be consumed and ejected out a nozzle when the propellant grain 220 is ignited.

In various embodiments, mandrel 100 may be hollow. In this regard, mandrel 100 may comprise a through hole 110 (see FIG. 1B). In this manner, flow of exhaust gas through any portion of mandrel 100 that is left behind in the propellant grain may be improved at the beginning of the burn cycle before the mandrel is ejected from the propellant grain. Furthermore, as discussed in greater detail with respect to FIG. 4, the through hole 110 of mandrel 100 may be filled with a support structure comprising a plurality of longitudinal channels to provide flow paths for exhaust gasses. For clarity purposes, a section view of propellant grain 220 is illustrated in FIG. 3 with the second portion 104 omitted for clarity purposes.

Figure 4:
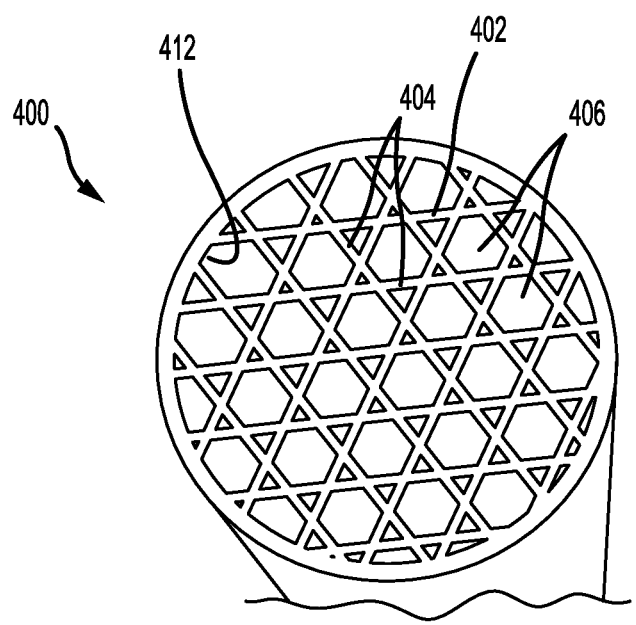
FIG. 4 illustrates a perspective view of a support structure infill for a mandrel, in accordance with various embodiments.

With reference to FIG. 4, a mandrel 400 comprising a support structure 402 is illustrated, in accordance with various embodiments. Support structure 402 may be disposed within mandrel 400. Support structure 402 may support the mandrel from collapsing during the casting process and/or during the life of the solid propellant motor. In this manner, the geometry of the propellant grain may be maintained over the life of the solid propellant motor which may increase the integrity of the solid propellant motor and decrease a tendency for the propellant grain to expand and/or contract which may lead to cracking. Support structure 402 may comprise a plurality of longitudinally extending walls 404 extending from an inner surface 412 of the mandrel 400. Longitudinally extending walls 404 may extend completely across mandrel 400 in a transverse direction (i.e., perpendicular to central axis 190) to connect to inner surface 412 of mandrel 400 at either sides thereof. Longitudinally extending walls 404 may extend longitudinally from one end of mandrel 400 to the opposite end of mandrel 400. In various embodiments, support structure 402 is manufactured integrally (i.e., monolithic) with mandrel 400 during an additive manufacturing process, such as a 3D printing process. In various embodiments, inner surface 412 defines a through hole extending through mandrel 400. In various embodiments, support structure 402 partially fills the through hole cavity. In this regard, support structure 402 may be referred to as an infill. Support structure 402 may define a plurality of channels 406 extending longitudinally through mandrel 400. Plurality of channels 406 may be open to both ends of mandrel 400. In this regard, mandrel 400 may be open at both ends thereof. In this manner, flow of exhaust gas through any portion of mandrel 400 that is left behind in a propellant grain may be improved at the beginning of the burn cycle prior to the mandrel being ejected from the propellant grain. In various embodiments, mandrel 100 of FIG. 1 may be similar to mandrel 400. Stated differently, mandrel 100 may similarly comprise a support structure infill.

Figure 5A:
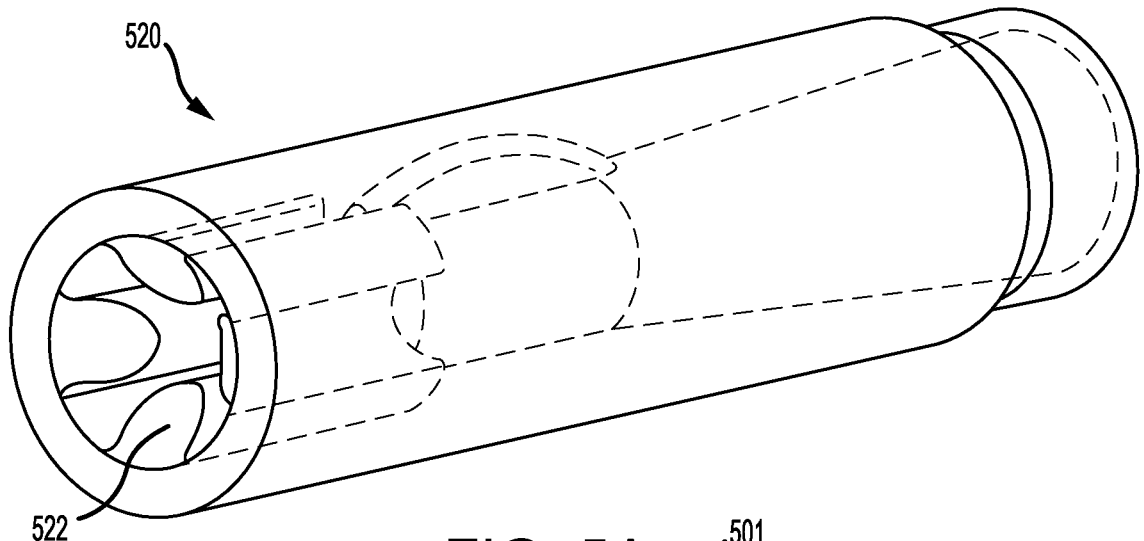
FIG. 5A illustrates a propellant grain formed using the mandrel of FIG. 5B, in accordance with various embodiments.
Figure 5B:
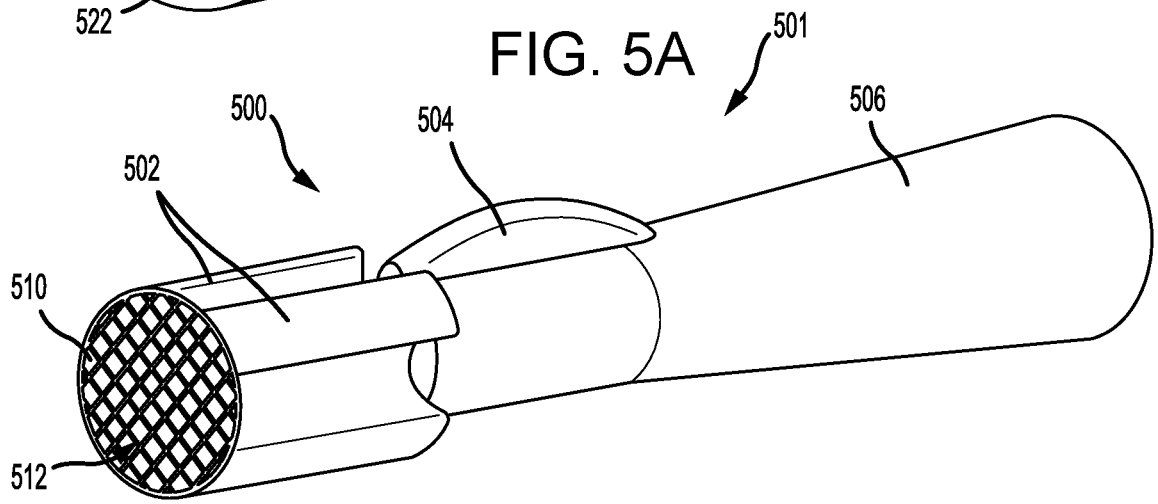
FIG. 5B illustrates the mandrel used to form the propellant grain of FIG. 5A, in accordance with various embodiments.

With reference to FIG. 5A, a propellant grain 520 manufactured using the mandrel 500 depicted in FIG. 5B is illustrated. With combined reference to FIG. 5A and FIG. 5B, mandrel 500 may comprise an elongated body 501. Elongated body 501 may comprise a through hole 510. Mandrel 500 may comprise a plurality of circumferentially disposed fins 502. The circumferentially disposed fins 502 may extend radially outward from mandrel 500 to form radially inward extending fins 522 in propellant grain 520, thereby increasing a surface area of propellant grain 220 at a first longitudinal location. Mandrel 500 may comprise a rounded fin 504. Rounded fin 504 may be disposed axially from fins 502. Mandrel 500 may comprise a frustoconical portion 506. All or part of mandrel 500 may be configured to remain within the propellant grain 520. Furthermore, mandrel 500 may comprise a support structure 512. Support structure 512 may be disposed in through hole 510. Support structure 512 may be similar to support structure 402 (see FIG. 4).

Figure 6A:
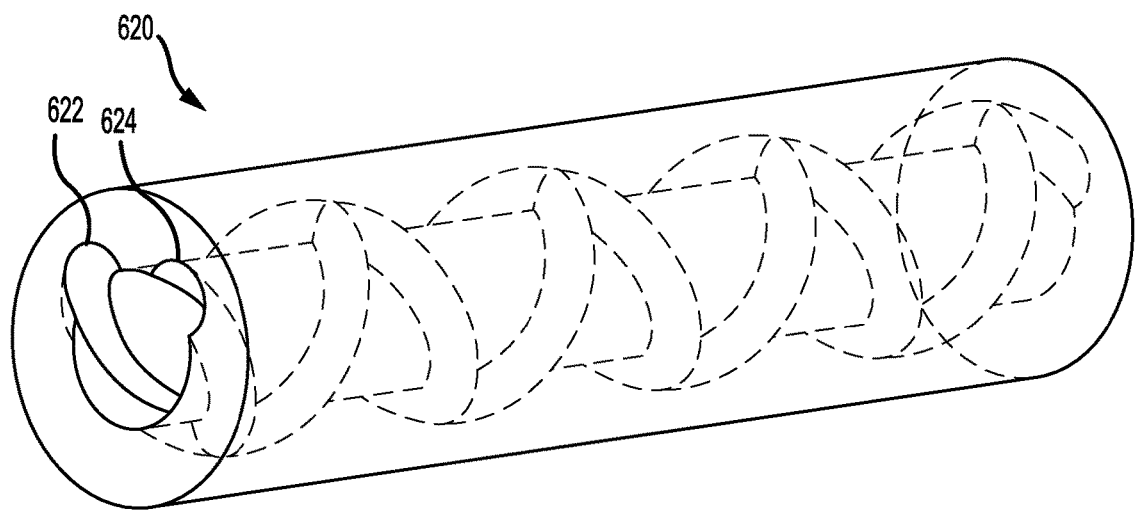
FIG. 6A illustrates a propellant grain formed using the mandrel of FIG. 6B, in accordance with various embodiments.
Figure 6B:
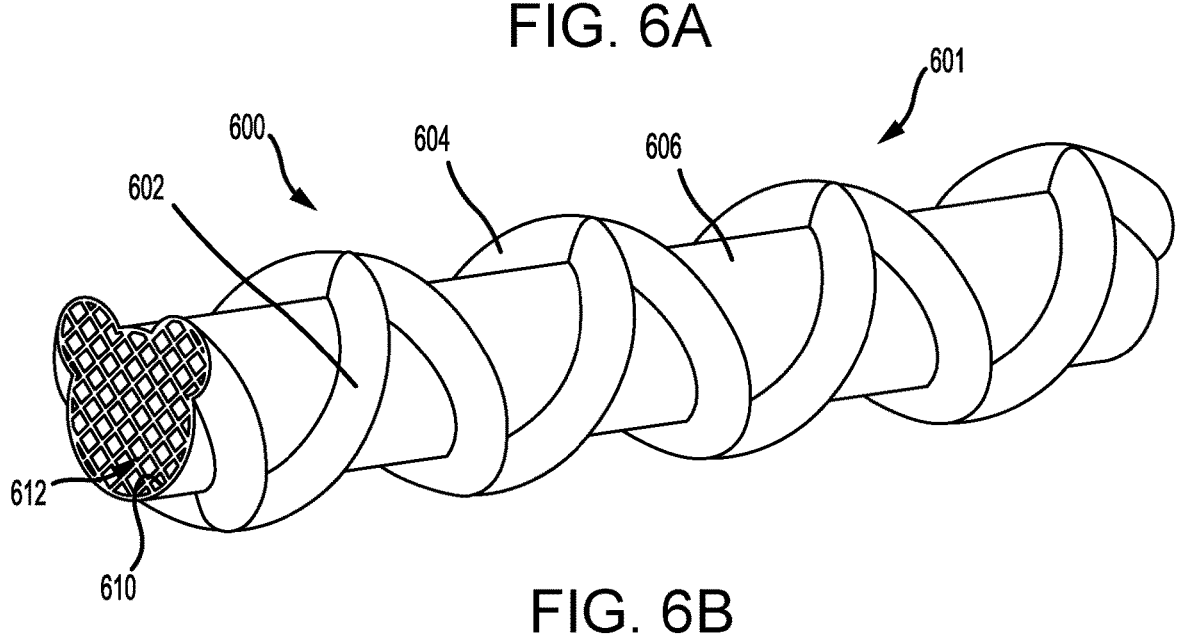
FIG. 6B illustrates the mandrel used to form the propellant grain of FIG. 6A, in accordance with various embodiments.

With reference to FIG. 6A, a propellant grain 620 manufactured using the mandrel 600 depicted in FIG. 6B is illustrated. With combined reference to FIG. 6A and FIG. 6B, mandrel 600 may comprise an elongated body 601. Elongated body 601 may comprise a through hole 610. Mandrel 600 may comprise a first helically extending ridge 602 disposed along the outer surface of mandrel 600. First helically extending ridge 602 may extend helically around mandrel 600 in a first rotational direction. First helically extending ridge 602 may form a first helically extending groove 622 disposed in propellant grain 620. Mandrel 600 may comprise a second helically extending ridge 604. Second helically extending ridge 604 may extend helically around mandrel 600 in a second rotational direction. Second helically extending ridge 604 may form a second helically extending groove 624 disposed in propellant grain 620. Mandrel 600 may further comprise a cylindrical surface 606, wherein the first helically extending ridge 602 and the second helically extending ridge 604 extend from cylindrical surface 606. All or part of mandrel 600 may be configured to remain within the propellant grain 620. Furthermore, mandrel 600 may comprise a support structure 612. Support structure 612 may be disposed in through hole 610. Support structure 612 may be similar to support structure 402 (see FIG. 4).

Figure 7A:
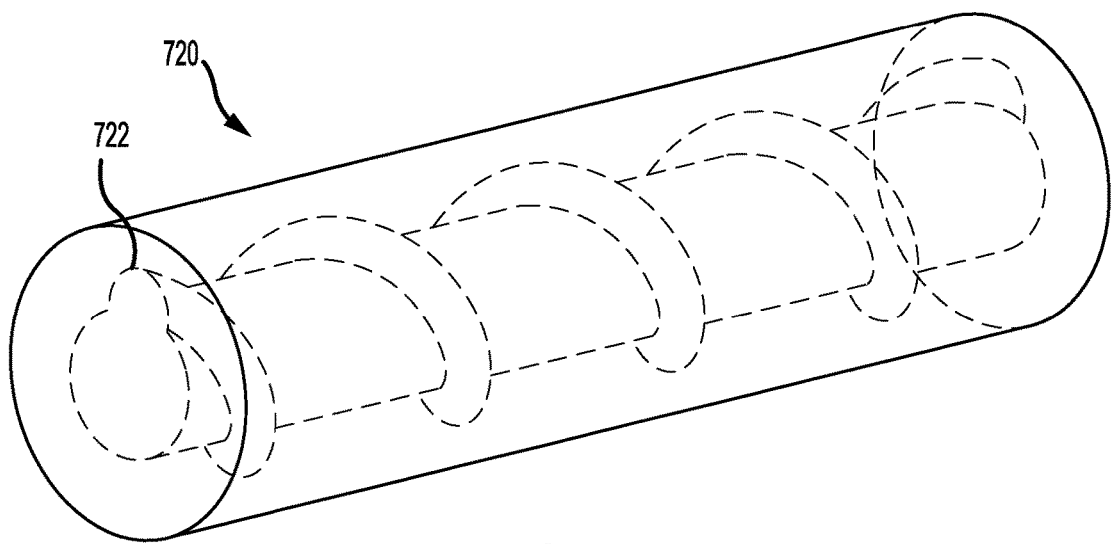
FIG. 7A illustrates a propellant grain formed using the mandrel of FIG. 7B, in accordance with various embodiments.
Figure 7B:
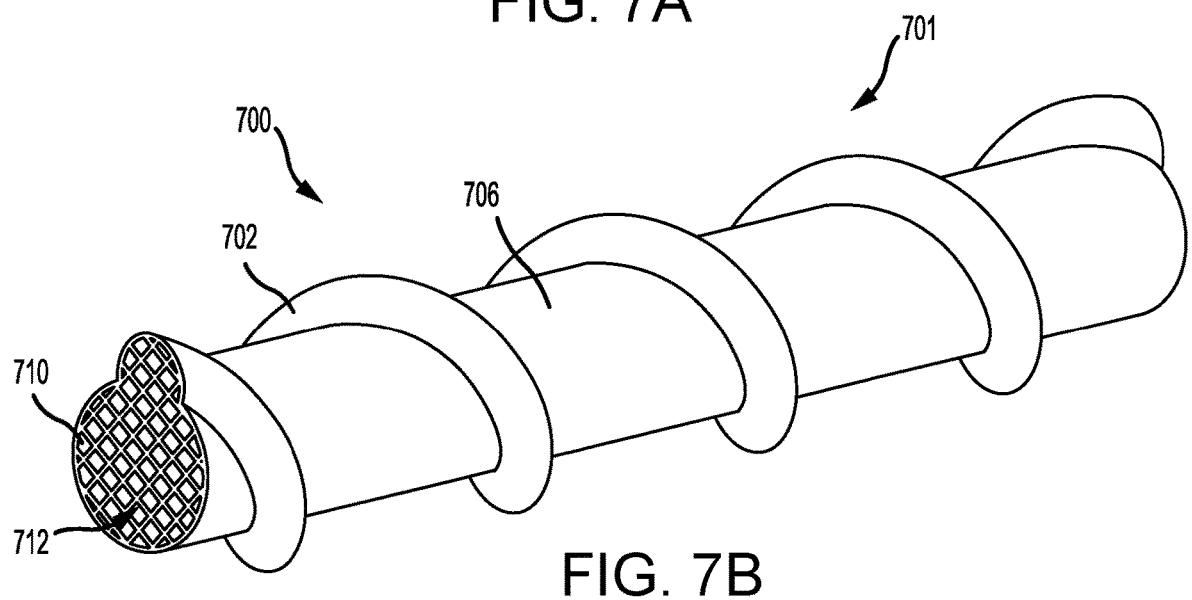
FIG. 7B illustrates the mandrel used to form the propellant grain of FIG. 7A, in accordance with various embodiments.

With reference to FIG. 7A, a propellant grain 720 manufactured using the mandrel 700 depicted in FIG. 7B is illustrated. Mandrel 700 may be similar to mandrel 600 of FIG. 6B, except that mandrel 700 comprises a single helically extending ridge. With combined reference to FIG. 7A and FIG. 7B, mandrel 700 may comprise an elongated body 701. Elongated body 701 may comprise a through hole 710. Mandrel 700 may comprise a helically extending ridge 702. Helically extending ridge 702 may extend helically around mandrel 700 in a first rotational direction. Helically extending ridge 702 may form a helically extending groove 722 disposed in propellant grain 720. Mandrel 700 may further comprise a cylindrical surface 706, wherein the helically extending ridge 702 extends from cylindrical surface 706. All or part of mandrel 700 may be configured to remain within the propellant grain 720. Furthermore, mandrel 700 may comprise a support structure 712. Support structure 712 may be disposed in through hole 710. Support structure 712 may be similar to support structure 402 (see FIG. 4).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mandrel for forming a solid propellant, comprising:
an elongated body extending in a longitudinal direction and comprising a first portion having a first wall thickness and a second portion axially adjacent the first portion;
wherein the second portion comprises a protuberant surface;
wherein an intersection of the first portion and the second portion has a wall thickness that is less than the first wall thickness, the intersection extending circumferentially around the elongated body; and wherein the first portion is configured to break apart from the second portion at the intersection after a propellant grain has been cured around the elongated body.

2. The mandrel of claim 1, further comprising a through hole disposed in the elongated body.

3. The mandrel of claim 2, further comprising a support structure disposed in the through hole.

4. The mandrel of claim 3, wherein the support structure comprises a plurality of longitudinal channels.

5. The mandrel of claim 1, wherein the protuberant surface comprises a non-longitudinal feature.

6. The mandrel of claim 1, further comprising a groove disposed in the elongated body, wherein the groove is disposed at the intersection between the first portion and the second portion.

7. The mandrel of claim 1, further comprising an end portion and a tapered portion, wherein the end portion is coupled to the first portion via the tapered portion.

8. The mandrel of claim 1, wherein the first portion and the second portion comprises a single, monolithic piece of material.

9. The mandrel of claim 8, wherein the elongated body comprises a thermoplastic material.

* * * * *